US012673541B2

(12) United States Patent
Chu et al.

(10) Patent No.: US 12,673,541 B2
(45) Date of Patent: Jul. 7, 2026

(54) SINGLE-POWER, ENTIRE ROOF-LIFTING MECHANISM FOR RECREATIONAL VEHICLES

(71) Applicant: RONGCHENG COMPAKS NEW ENERGY AUTOMOBILE CO., LTD, Weihai City (CN)

(72) Inventors: Fuyao Chu, Weihai City (CN); Jianjun Chen, Weihai City (CN); Shaoxun Liu, Weihai City (CN); Chuanjie Wang, Weihai City (CN); Shilei Wang, Weihai City (CN); Peng Zhang, Weihai City (CN)

(73) Assignee: RONGCHENG COMPAKS NEW ENERGY AUTOMOBILE CO., LTD., Weihai City (CN)

( * ) Notice: Subject to any disclaimer, the term of this patent is extended or adjusted under 35 U.S.C. 154(b) by 0 days.

(21) Appl. No.: 18/995,135

(22) PCT Filed: Apr. 3, 2024

(86) PCT No.: PCT/CN2024/085729
§ 371 (c)(1),
(2) Date: Jan. 15, 2025

(87) PCT Pub. No.: WO2025/152277
PCT Pub. Date: Jul. 24, 2025

(65) Prior Publication Data
US 2025/0360780 A1 Nov. 27, 2025

(30) Foreign Application Priority Data
Jan. 15, 2024 (CN) .......................... 202410053115.0

(51) Int. Cl.
*B60J 7/16* (2006.01)
*F16H 37/12* (2006.01)

(52) U.S. Cl.
CPC ............ *B60J 7/165* (2013.01); *F16H 37/126* (2013.01)

(58) Field of Classification Search
CPC ..... B60J 7/16; B60J 7/165; B60P 3/34; F16H 37/126
See application file for complete search history.

(56) References Cited

U.S. PATENT DOCUMENTS

| | | | | |
|---|---|---|---|---|
| 3,924,889 A | * | 12/1975 | Gogush ..................... | B60P 3/34 296/26.07 |
| 6,325,447 B1 | * | 12/2001 | Kuo ........................ | B60P 3/341 296/99.1 |

(Continued)

FOREIGN PATENT DOCUMENTS

| | | | |
|---|---|---|---|
| CN | 106703470 A | | 5/2017 |
| CN | 207630931 U | * | 7/2018 |

(Continued)

OTHER PUBLICATIONS

International Search Report and Written Opinion in Corresponding International Application No. PCT/CN2024/085729, mailed Sep. 14, 2024; 15 pgs.

(Continued)

*Primary Examiner* — Lori Lyjak
(74) *Attorney, Agent, or Firm* — HAUPTMAN HAM, LLP

(57) ABSTRACT

The present disclosure provides a single-power, roof-lifting mechanism for recreational vehicles. It includes a first, second, third, and fourth swing member; a first and second connector; a first and second support member; guide members; and a driving element. The first and third swing members are fixedly connected to the first connector, while the second and fourth swing members are fixedly connected to the second connector. The upper ends of the support members are rotatably connected to the roof, their middles (Continued)

to the third and fourth swing members, and their lower ends to the guide members, allowing relative movement. The driving element powers the swing members simultaneously, driving the support members to lift or lower the roof. This system is powered by a single electric motor, ensuring a simplified, cost-effective, and reliable design. As a result, the disclosed mechanism offers significant market potential for recreational vehicle applications.

10 Claims, 4 Drawing Sheets

(56) References Cited

U.S. PATENT DOCUMENTS

| | | | |
|---|---|---|---|
| 7,090,286 | B1 | 8/2006 | Foreth et al. |
| 2004/0227369 | A1* | 11/2004 | Davidson ............... B60J 7/1614 |
| | | | 296/26.07 |

| | | | |
|---|---|---|---|
| 2012/0223540 | A1* | 9/2012 | Peck ........................ B60P 3/34 |
| | | | 254/92 |

FOREIGN PATENT DOCUMENTS

| | | |
|---|---|---|
| CN | 110733401 A | 1/2020 |
| CN | 216268926 U | 4/2022 |
| CN | 216611022 U | 5/2022 |
| CN | 218316439 U | 1/2023 |
| CN | 117755192 A | 3/2024 |
| CN | 117755194 A | 3/2024 |

OTHER PUBLICATIONS

First Office Action issued in Chinese Application No. 202410053115.0, mailed Aug. 9, 2025, 10 pages.
Search Report issued in Chinese Application No. 202410053115.0, dated Aug. 7, 2025, 4 pages.

* cited by examiner

SINGLE-POWER, ENTIRE ROOF-LIFTING MECHANISM FOR RECREATIONAL VEHICLES

CROSS-REFERENCE TO RELATED APPLICATIONS

The present application is a U.S. National Phase of International Application Number PCT/CN2024/085729 filed Apr. 3, 2024, which claims priority to Chinese Patent application No. 202410053115.0, filed with the Chinese Patent Office on Jan. 15, 2024.

BACKGROUND OF THE PRESENT INVENTION

Field of Invention

The present disclosure relates to the technical field of recreational vehicles, and in particular to a single-power roof-lifting mechanism for recreational vehicles.

Description of Related Arts

Advancements in technology and improvements in people's living standards have prompted a surge in self-driving recreational vehicle vacations. With the superiority in comprehensive solution to transportation, accommodation, catering, etc. in the journey, the recreational vehicles are not limited by external conditions, offering a homely ambiance while having high economic efficiency.

However, the recreational vehicles (especially the most popular C-type self-driving models in China) are obviously inferior in space. Especially, a size-fixed compartment generally results in small activity space and undesirable user experience under the restriction of various factors. Thus, an expandable compartment is designed, featuring extensions in both width and height. With the attempt to expand the vertical activity space inside the compartment, the most common practice is to lift the roof through a roof-lifting mechanism.

A scissor support arm structure with an X shape connected through hinge pins is widely used in the prior art, as disclosed in Chinese Patents CN 216268926 U, CN 218316439 U. However, premature failure and damage of the structure are likely to be caused due to a small initial driving arm of and a high moment borne by the driving link (an electric pusher, a hydraulic cylinder, etc.), in that this structure in an initial state (i.e. in a case that two support arms are stacked close together) is closed to a dead center position relative to the direction of the driving force. Moreover, when in use, the roof of the recreational vehicle is likely to swing and dislocate laterally because of the X-shaped structure with low stability and a limited bearing capacity. Especially in windy weather, it is highly possible to damage the roof structure. In addition, the use of multiple power sources complicates synchronous control over a lifting or lowering process, resulting in complex operations and high costs.

According to Chinese Patent CN 110733401 A, a roof-lifting structure for recreational vehicles realizes a roof-lifting function by driving a long arm 18 hinged to a sliding table 19 to lift and lower through a bidirectional threaded screw rod 20. While four lifting and lowering mechanisms at a front end and a rear end of a roof can be synchronously lifted or lowered through the roof lifting structure, an electric motor and structural members are likely to be damaged, limiting its practicability. Because this structure still faces the problem that it is close to a dead center position relative to the direction of the driving force in its initial state, leading to a small initial driving arm.

The solution that electric pushers are fixed to positions close to four corners of the compartment respectively, and the roof is lifted directly by the four electric pushers is also available in the prior art. Although this solution provides a reasonable force distribution on the roof and small space is occupied, it is difficult to achieve synchronously control of the four pushers. Moreover, in the roof-lifting process, structures or electric motors are probably damaged after forces applied to the four pushers interfere with each other. The entire device cannot work after one electric motor is damaged, so that the solution has defects of high costs, low reliability, etc.

SUMMARY OF THE PRESENT INVENTION

In view of the above, the present disclosure provides a single-power, entire roof-lifting mechanism for recreational vehicles, designed to achieve the lifting of the entire roof through single power, offering high bearing capacity, reasonable driving moment throughout the lifting process, and manual-automatic integration, so that at least some problems in the prior art can be solved. To realize the above objective, the technical solution employed in the present disclosure is as follows:

A single-power, entire roof-lifting mechanism for recreational vehicles includes a first swing member, a second swing member, a third swing member, a fourth swing member, a first connector, a second connector, a first support member, a second support member, a guide member, and a driving element, where an upper end of the first swing member is fixedly connected to the first connector, positions, close to two ends, of the first connector are fixedly connected to lower ends of the third swing members respectively, the two ends of the first connector are rotatably supported at a top of a compartment, upper ends of the third swing members are rotatably connected to middles of the first support members, lower ends of the first support members are rotatably connected to the guide members, and move relative to the guide members, and upper ends of the first support members are rotatably connected to a roof;

an upper end of the second swing member is fixedly connected to the second connector, positions, close to two ends, of the second connector are fixedly connected to lower ends of the fourth swing members respectively, the two ends of the second connector are rotatably supported at the top of the compartment, upper ends of the fourth swing members are rotatably connected to middles of the second support members, lower ends of the second support members are rotatably connected to the guide members, and move relative to the guide members, and upper ends of the second support members are rotatably connected to the roof; and the guide members are fixedly arranged at the top of the compartment, and the driving element drives the first swing member and the second swing member to swing inwards or outwards simultaneously.

Furthermore, the driving element includes a bidirectional threaded screw rod, a first nut, a second nut, and an electric motor; a lower end of the first swing member is rotatably connected to the first nut, and the first nut is in threaded connection to a first helical section of the bidirectional threaded screw rod; a lower end of the second swing member is rotatably connected to the second nut, and the second nut is in threaded connection to a second helical section of the bidirectional threaded screw rod; and the electric motor is connected to one end of the bidirectional threaded screw rod.

Furthermore, the first connector and the second connector are of torsion shaft structures that span the entire compartment in a width direction, and the two ends of the first connector and the second connector are rotatably supported at the top of the compartment through bearing seats respectively.

Furthermore, two third swing members are provided in parallel, two fourth swing members are provided in parallel, two first support members are provided in parallel, and two second support members are provided in parallel.

Furthermore, the upper ends of the first support members and the second support members are rotatably connected to the roof through adapters respectively.

Furthermore, the lower ends of the first support members and the second support members are provided with rolling bearings respectively, and are in contact and cooperation with the guide members through the rolling bearings.

As a preferred embodiment, the driving element includes a bidirectional threaded screw rod, a first nut, a second nut, an electric motor, and a transmission member; a lower end of the first swing member is rotatably connected to the first nut, and the first nut is in threaded connection to a first helical section of the bidirectional threaded screw rod; the second nut is fixed to one end of the transmission member, and is in threaded connected to a second helical section of the bidirectional threaded screw rod, and the other end of the transmission member is rotatably connected to a lower end of the second swing member; and the electric motor is connected to one end, close to the first helical section, of the bidirectional threaded screw rod.

Furthermore, the transmission member is a square tube, the second nut shaped in cuboid is positioned inside the transmission member, and the second nut has a greater axial length than the first nut.

Furthermore, the electric motor includes a built-in reducer, and is connected to slide up and down along one side wall in the compartment.

Furthermore, the bidirectional threaded screw rod passes through the reducer to be provided with an overhanging portion, and the overhanging portion is detachably connected to a hand-operated mechanism.

As a preferred embodiment, the driving element includes an electric motor, transmission members, a gear, and a worm gear reducer; the transmission members includes a first transmission member and a second transmission member, one ends of the first transmission member and the second transmission member are rotatably connected to lower ends of the first swing member and the second swing member respectively, and the other ends of the first transmission member and the second transmission member engage with an upper end and a lower end of the gear through a rack respectively; and the electric motor is connected to one end of a worm shaft of the worm gear reducer, so as to drive the gear to rotate.

Furthermore, the other end of the worm shaft of the worm gear reducer extends outwards to be detachably connected to a hand-operated mechanism.

Compared with the prior art, the present disclosure has significant advantages as follows:

1. The entire roof can be driven to lift or lower through only one electric motor, ensuring a simplified operation, a simple and reliable structure, and low costs.
2. The two swing members are driven to swing inwards or outwards simultaneously through a driving mechanism, so that two torsion shafts rotate, and the roof is ultimately driven to lift or lower through an intermediate mechanism. Throughout the process, the driving arm is basically unchanged, roughly equivalent a vertical height of the first swing member (or the second swing member). This results in a reasonable and consistently stable driving force.
3. Integration of electric and manual lifting or lowering functions is realized, thereby improving the reliability of the system, and avoiding the risk of being stranded in the wild due to a malfunctioning electric motor that prevents the lifting mechanism from descending.

DETAILED DESCRIPTION OF THE PREFERRED EMBODIMENT

Figure 1:
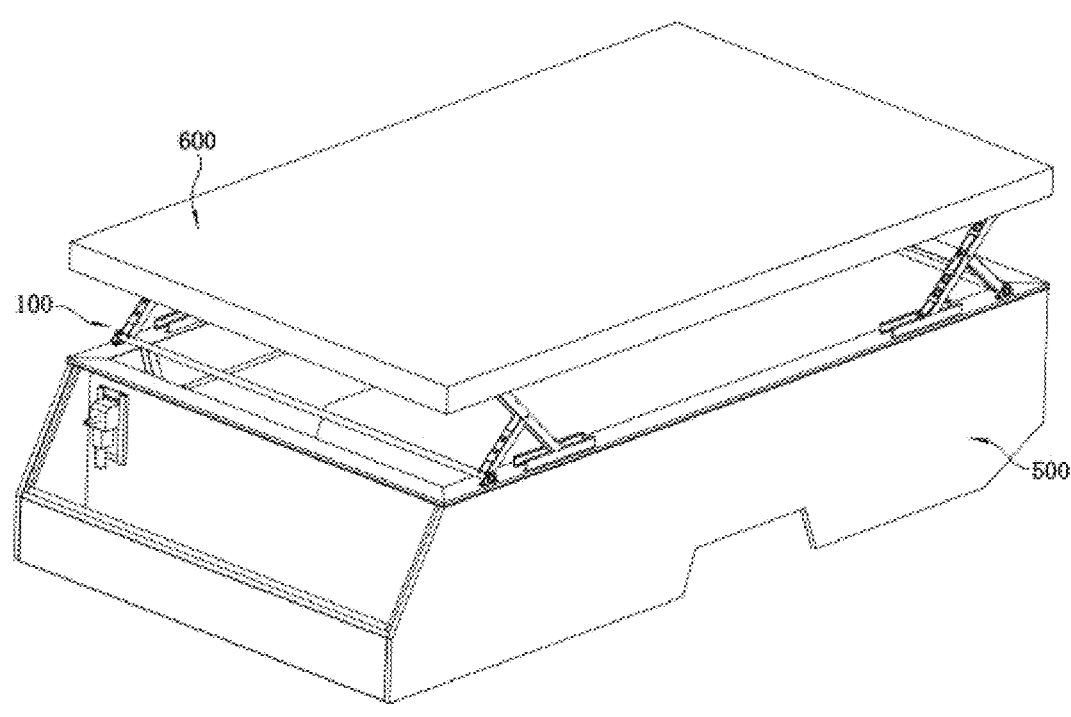
FIG. 1 is a schematic structural diagram of a roof-lifting mechanism in a lifted state according to Example 1 of the present disclosure.

Examples of the present disclosure are described in detail below and illustratively shown in the accompanying drawings. The same or similar reference numerals denote the same or similar elements or elements having the same or similar functions throughout. The examples described below with reference to the accompanying drawings are illustrative and are intended to explain the present disclosure, but cannot be interpreted as limiting the present disclosure.

The present disclosure will be described in detail below with reference to the accompanying drawings and specific examples.

Figure 2:
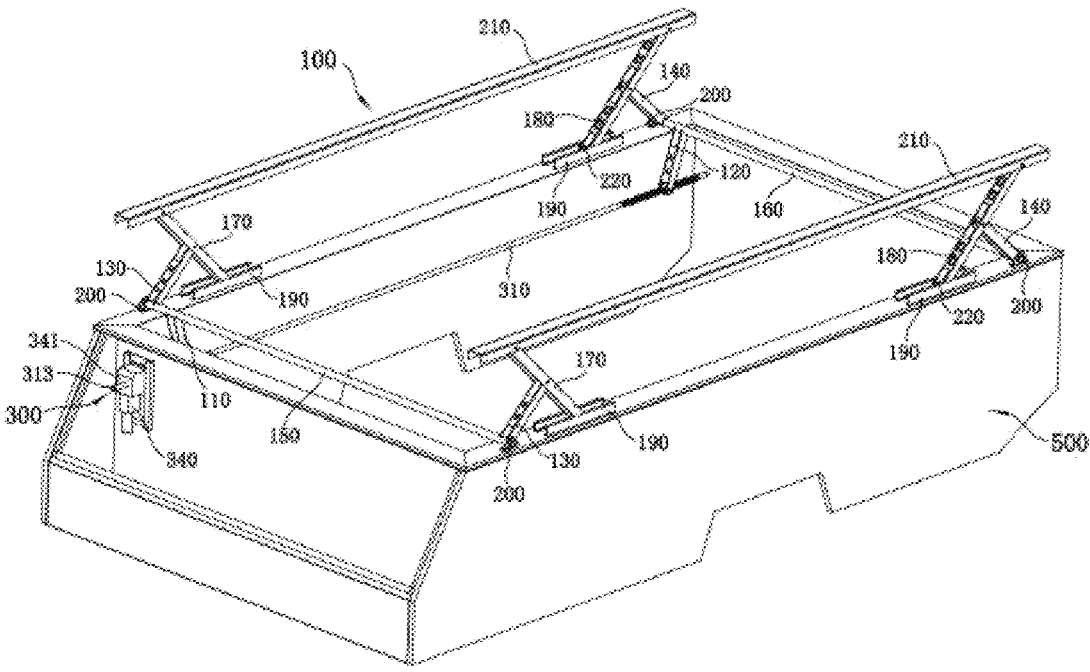
FIG. 2 is a schematic structural diagram of a roof-lifting mechanism (with a roof omitted) in a lifted state according to Example 1 of the present disclosure.
Figure 3:
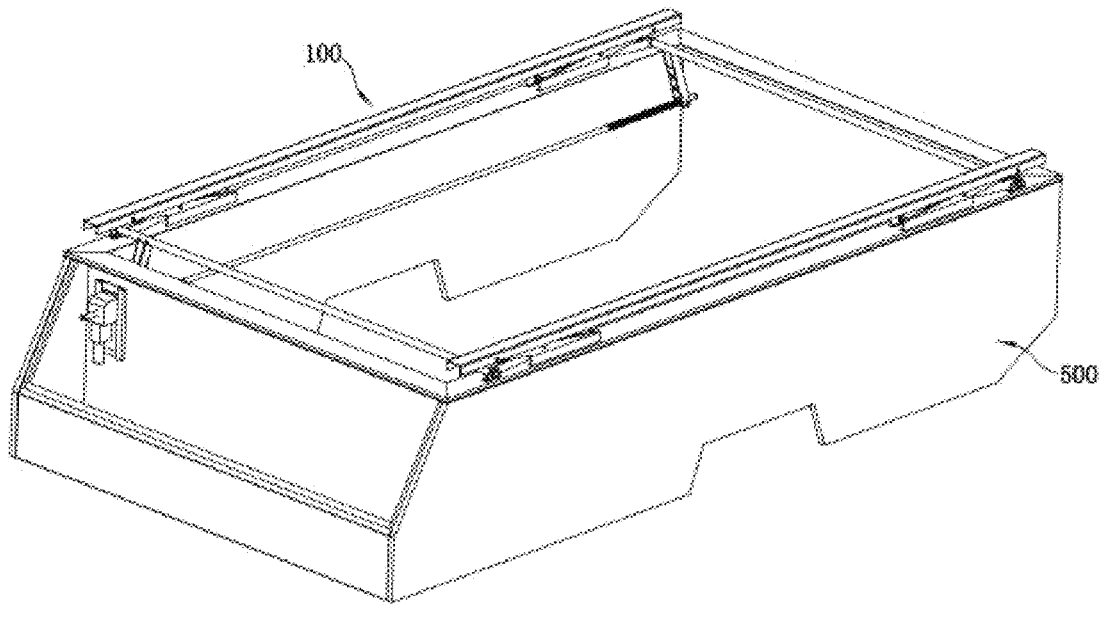
FIG. 3 is a schematic structural diagram of a roof-lifting mechanism (with a roof omitted) in a lowered state according to Example 1 of the present disclosure.

Example 1: as shown in FIGS. 1-3, a single-power, entire roof-lifting mechanism 100 for recreational vehicles includes:

a first swing member 110, a second swing member 120, a third swing member 130, a fourth swing member 140, a first connector 150, a second connector 160, a first support member 170, a second support member 180, a guide member 190, and a driving element 300, where an upper end of the first swing member 110 is fixedly connected to the first connector 150, positions, close to two ends, of the first connector 150 are fixedly connected to lower ends of the third swing members 130 respectively, the two ends of the first connector 150 are rotatably supported at a top of a compartment 500, upper ends of the third swing members 130 are rotatably connected to middles of the first support members 170, lower ends of the first support members 170 are rotatably connected to the guide members 190, and move relative to the guide members 190, and upper ends of the first support members 170 are rotatably connected to a roof 600;

an upper end of the second swing member 120 is fixedly connected to the second connector 160, positions, close to two ends, of the second connector 160 are fixedly connected to lower ends of the fourth swing members 140 respectively, the two ends of the second connector 160 are rotatably supported at the top of the compartment 500, upper ends of the fourth swing members 140 are rotatably connected to middles of the second support members 180, lower ends of the second support members 180 are rotatably connected to the guide members 190, and move relative to the guide members 190, and upper ends of the second support members 180 are rotatably connected to the roof 600; and the guide members 190 are fixedly arranged at the top of the compartment 500, and the driving element 300 drives the first swing member 110 and the second swing member 120 to swing inwards or outwards simultaneously.

Figure 4:
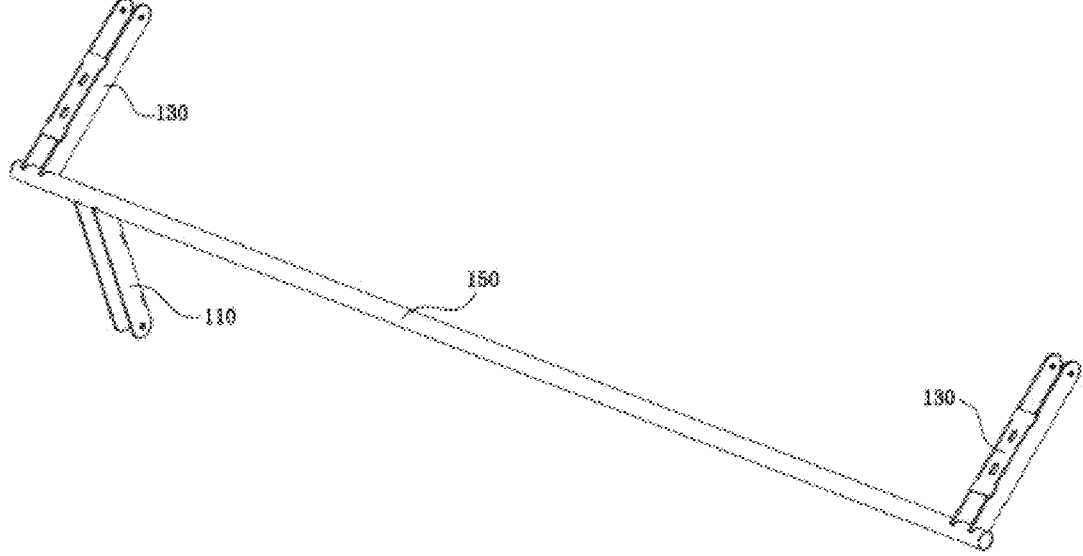
FIG. 4 is a schematic diagram of an overall structure formed by a first swing member, a third swing member, and a first connector according to Example 1 of the present disclosure.
Figure 5:
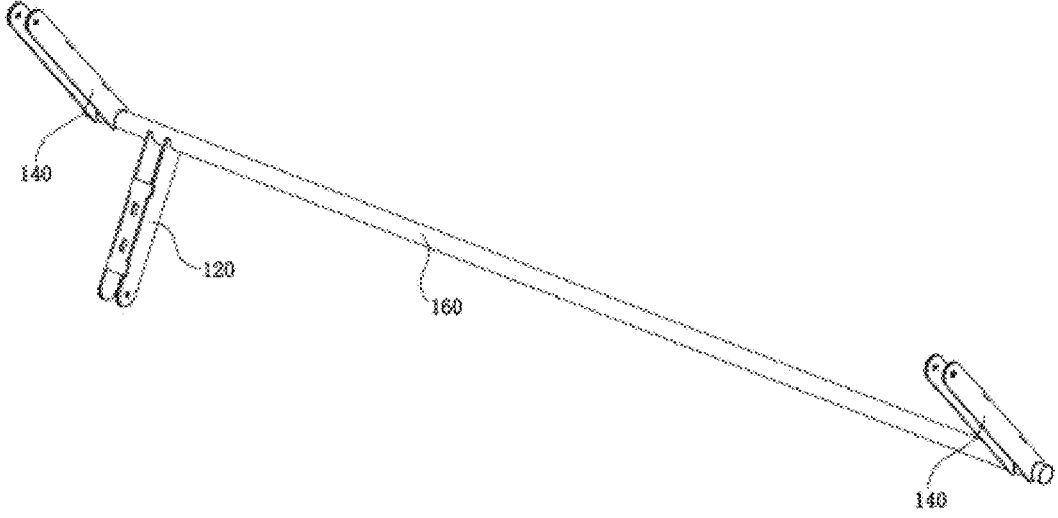
FIG. 5 is a schematic diagram of an overall structure formed by a second swing member, a fourth swing member, and a second connector according to Example 1 of the present disclosure.

It should be noted that in order to highlight the core technical solution of the present disclosure, only a portion of the compartment 500 and the roof 600 are illustratively depicted, and the structure is accordingly simplified. As shown in FIGS. 4 and 5, preferably, the first swing member 110 and the third swing member 130 are fixed to the first connector 150 through welding, and the second swing member 120 and the fourth swing member 140 are fixed to the second connector 160 through welding. An included angle between the first swing member 110 and the third swing member 130 ranges from 110° to 130°, most preferably 112° to 116°. An included angle between the second swing member 120 and the fourth swing member 140 ranges from 110° to 130°, most preferably 112° to 116°.

Figure 6:
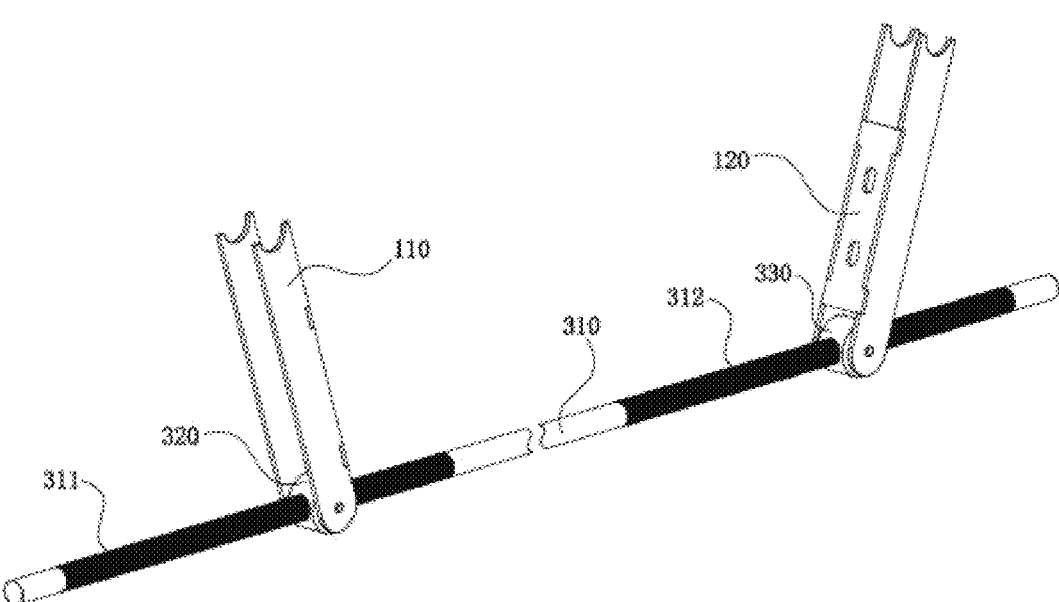
FIG. 6 is a schematic diagram of a partial structure of a driving element according to Example 1 of the present disclosure.

As shown in FIG. 6, as a preferred embodiment, the driving element 300 includes a bidirectional threaded screw rod 310 (drawn roughly because of its length), a first nut 320, a second nut 330, and an electric motor 340; a lower end of the first swing member 110 is rotatably connected to the first nut 320, and the first nut 320 is in threaded connection to a first helical section 311 of the bidirectional threaded screw rod 310; a lower end of the second swing member 120 is rotatably connected to the second nut 330, and the second nut 330 is in threaded connection to a second helical section 312 of the bidirectional threaded screw rod 310; and the electric motor 340 is connected to one end of the bidirectional threaded screw rod 310. Forces are transmitted through the bidirectional threaded screw rod, ensuring a simple structure and a self-locking function.

Furthermore, the electric motor 340 includes a built-in reducer 341, and is connected to slide up and down along one side wall in the compartment 500. The slidable arrangement of the electric motor is to compensate for a slight distance change in a vertical direction when the first swing member 110 and the second swing member 120 swing, so that structural interference is avoided.

As a preferred embodiment, the bidirectional threaded screw rod 310 passes through the reducer 341 to be provided with an overhanging portion 313, and the overhanging portion 313 is detachably connected to a hand-operated mechanism. The hand-operated mechanism is arranged to avoid the risk of being stranded in the wild due to a malfunctioning electric motor that prevents the lifting mechanism from descending. High safety risks will be caused by significant wind resistance if the roof is not lowered for driving. In addition, the recreational vehicle with the roof not lowered cannot pass through an area having a height limit.

Furthermore, the first connector 150 and the second connector 160 are of torsion shaft structures that span the entire compartment 500 in a width direction, and the two ends of the first connector and the second connector are rotatably supported at the top of the compartment 500 through bearing seats 200 respectively. The bearing seats 200 are preferably slidable bearing seats, so as to further shorten a height in the vertical direction.

Furthermore, two third swing members 130 are provided in parallel, two fourth swing members 140 are provided in parallel, two first support members 170 are provided in parallel, and two second support members 180 are provided in parallel.

As a preferred embodiment, the upper ends of the first support members 170 and the second support members 180 are rotatably connected to the roof 600 through adapters 210 respectively. The adapters 210 are advantageously arranged to facilitate modular mounting, save mounting and adjusting time, enhance connection with the roof, and make stress on the roof more uniform. The adapters can be manufactured integrally or separately, preferably made of aluminum alloy, and provided with a plurality of weight reduction holes.

As a preferred embodiment, the lower ends of the first support members 170 and the second support members 180 are provided with rolling bearings 220 respectively, and are in contact and cooperation with the guide members 190 through the rolling bearings 220 to further reduce friction. The rolling bearings 220 are preferably rubber-coated bearings, and the guide members 190 are preferably divided into four separate parts for easy manufacturing while saving costs.

Figure 7:
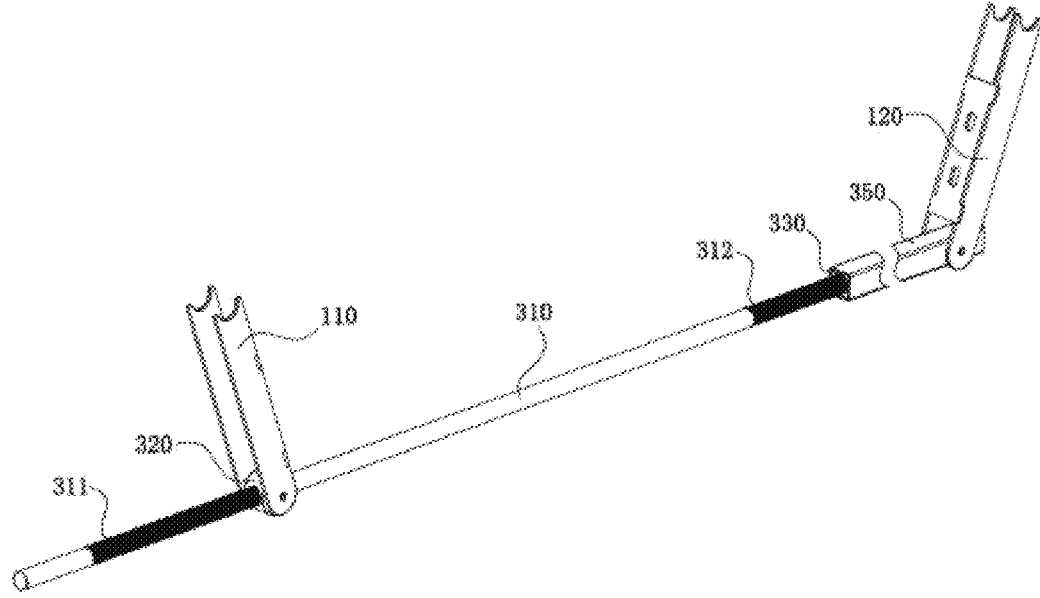
FIG. 7 is a schematic diagram of a partial structure of a driving element according to Example 2 of the present disclosure.
Figure 8:
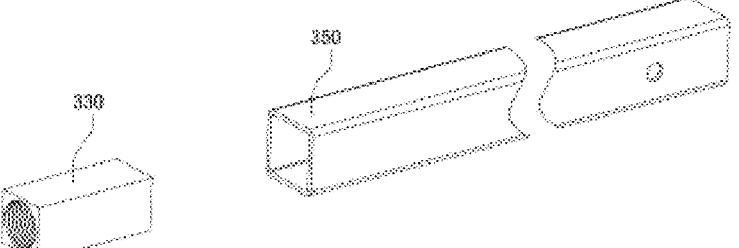
FIG. 8 is an exploded view of a second nut and a transmission member according to Example 2 of the present disclosure.

Example 2: as shown in FIGS. 7 and 8, the same parts as those in Example 1 are not repeated. Differently, the driving element 300 further includes a transmission member 350 (drawn roughly because of its length); a second nut 330 is fixed to one end of the transmission member 350, and is in threaded connected to a second helical section 312 of a bidirectional threaded screw rod 310, and the other end of the transmission member 350 is rotatably connected to a lower end of the second swing member 120; and an electric motor 340 is connected to one end, close to a first helical section 311, of the bidirectional threaded screw rod 310. Such a structure does not affect force transmission, but can obviously shorten a length of the bidirectional threaded screw rod 310, so that the bidirectional threaded screw rod is convenient to process and manufacture.

Preferably, the transmission member 350 is a square tube, the second nut 330 shaped in cuboid is positioned inside the transmission member 350, and the second nut 330 has a greater axial length than the first nut 320. The second nut 330 is set to be longer, so as to guide the bidirectional threaded screw rod, and prevent deflection during the force transmission.

Figure 9:
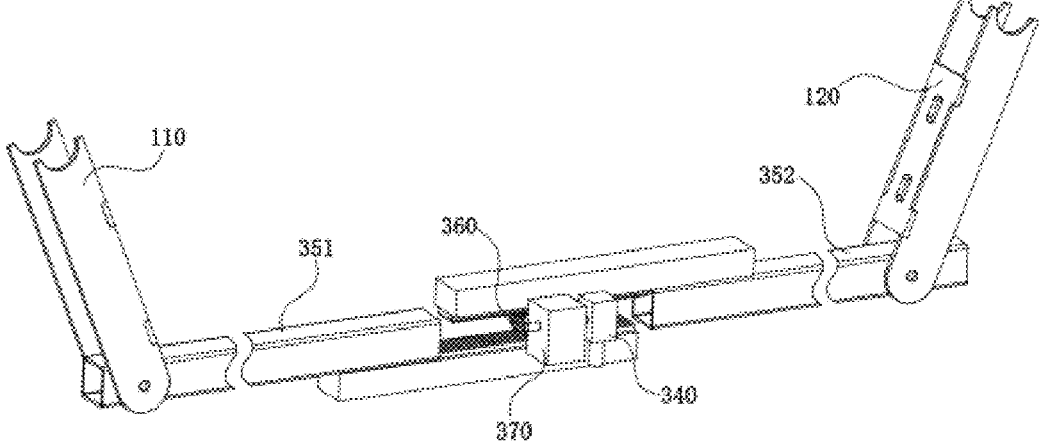
FIG. 9 is a schematic structural diagram of a driving element according to Example 3 of the present disclosure.

Example 3: as shown in FIG. 9, the same parts as those in Example 1 are not repeated. Differently, the driving element 300 includes an electric motor 340, transmission members 350, a gear 360, and a worm gear reducer 370; the transmission members 350 include a first transmission member 351 and a second transmission member 352, one ends of the first transmission member 351 and the second transmission member 352 are rotatably connected to lower ends of the first swing member 110 and the second swing member 120 respectively, and the other ends of the first transmission member 351 and the second transmission member 352 engage with an upper end and a lower end of the gear 360 through a rack respectively; the electric motor 340 is connected to one end of a worm shaft of the worm gear reducer 370, and the gear 360 is connected to one end of the worm gear shaft of the worm gear reducer 370; and the electric motor 340 drives the gear 360 to rotate and move the first transmission member 351 and the second transmission member 352 move inwards or outwards in turn. A rack and pinion mechanism is employed to facilitate modular design. In addition, the first transmission member 351 and the second transmission member 352 can be of a narrow-square-tube structures, so that distances between the transmission members and side surfaces of the compartment are further shortened, and the space utilization is improved. The worm gear reducer is employed for speed reduction, self-locking, and the use of the hand-operated mechanism.

As a preferred embodiment, the other end of the worm shaft of the worm gear reducer 370 extends outwards to be detachably connected to the hand-operated mechanism.

In addition, the driving element can also be of other structures, such as a hydraulic cylinder, an air cylinder, and an electric pusher, as long as power can be transmitted to the lower ends of the first swing member and the second swing member. However, since the hydraulic cylinder and the air cylinder cannot realize self-locking, the manual function cannot be achieved. Moreover, the hydraulic cylinder and the air cylinder have complex structures, a hydraulic operation is likely to involve oil leakage risks, and a pneumatic operation also produce terrible noise. The electric pusher can realize self-locking, but is generally purchased as a whole, and thus the manual function still cannot be achieved. In consequence, these solutions are not preferred.

The operation principle of the single-power, entire roof-lifting mechanism for recreational vehicles is as follows:

To lift the roof, the electric motor drives the bidirectional threaded screw rod or the gear to rotate through the reducer. Accordingly, the first swing member and the second swing member are driven to swing inwards, the first support members and the second support members are further driven to rotate and lift simultaneously relative to the guide members respectively, and ultimately the roof is driven to lift to its maximum height.

Conversely, to lower the roof, the electric motor is driven reversely. In this case, the entire mechanism operates in a reverse manner as described above, which will not be repeated. In the event of electric motor failure, the above lifting or lowering process can be manually implemented through the hand-operated mechanism, so that the risk of being stranded in the wild due to a malfunctioning electric motor that prevents the lifting mechanism from descending can be avoided.

According to the present disclosure, the driving arm in the lifting mechanism is basically unchanged throughout the process, equivalent to a vertical distance from the top of the compartment to the lower end of the first swing member (or the second swing member) all the time. This results in a reasonable and consistently stable driving force, and avoids damaging the electric motor and other components.

In the description of the present disclosure, it should be noted that the orientation or position relations indicated by the terms "center", "upper", "lower", "left", "right", "vertical", "horizontal", "internal", "external", etc. are based on the orientation or position relations shown in the accompanying drawings, are merely for facilitating the description of the present disclosure, rather than indicating or implying that the device or element referred to must have a particular orientation or be constructed and operated in a particular orientation, and thus cannot be interpreted as limiting the present disclosure. In addition, the terms "first" and "second" are merely for description, and cannot be interpreted as indicating or implying relative importance.

In the description of the present disclosure, it should be noted that the terms "provide", "connect", and "connection" should be understood in a broad sense, unless explicitly specified and defined otherwise. For example, they can denote a fixed connection, a detachable connection, a mechanical connection, an electrical connection, a direct connection, an indirect connection via an intermediate medium, or communication inside two elements. For those of ordinary skill in the art, the specific meanings of the above terms in the present disclosure can be understood according to specific circumstances.

The above embodiments merely illustrate the basic principles and characteristics of, and are not intended to limit the present disclosure. Various changes and modifications can also be made to the present disclosure without departing from its spirit and scope, and these changes and modifications fall within the claimed scope of protection of the present disclosure. The claimed scope of protection of the present disclosure is defined by the appended claims and their equivalents.

The invention claimed is:

1. A single-power, entire roof-lifting mechanism for recreational vehicles, comprising a first swing member, a second swing member, two third swing members provided in parallel, two fourth swing members provided in parallel, a first connector, a second connector, two first support members provided in parallel, two second support members provided in parallel, guide members, and a driving element, wherein an upper end of the first swing member is fixedly connected to the first connector, positions, close to two ends, of the first connector are fixedly connected to lower ends of the third swing members respectively, the two ends of the first connector are rotatably supported at a top of a compartment through bearing seats, upper ends of the third swing members are rotatably connected to middles of the first support members, lower ends of the first support members are rotatably connected to the guide members, and move relative to the guide members, and upper ends of the first support members are rotatably connected to a roof;

an upper end of the second swing member is fixedly connected to the second connector, positions, close to two ends, of the second connector are fixedly connected to lower ends of the fourth swing members respectively, the two ends of the second connector are rotatably supported at the top of the compartment through bearing seats, upper ends of the fourth swing members are rotatably connected to middles of the second support members, lower ends of the second support members are rotatably connected to the guide members, and move relative to the guide members, and upper ends of the second support members are rotatably connected to the roof; and the first connector and the second connector are of torsion shaft structures that span the entire compartment in a width direction; the guide members are fixedly arranged at the top of the compartment, and the driving element drives the first swing member and the second swing member to swing inwards or outwards simultaneously.

2. The single-power, entire roof-lifting mechanism for recreational vehicles according to claim 1, wherein the driving element comprises a bidirectional threaded screw rod, a first nut, a second nut, and an electric motor; a lower end of the first swing member is rotatably connected to the first nut, and the first nut is in threaded connection to a first helical section of the bidirectional threaded screw rod; a lower end of the second swing member is rotatably connected to the second nut, and the second nut is in threaded connection to a second helical section of the bidirectional threaded screw rod; and the electric motor is connected to one end of the bidirectional threaded screw rod.

3. The single-power, entire roof-lifting mechanism for recreational vehicles according to claim 1, wherein the upper ends of the first support members and the second support members are rotatably connected to the roof through adapters respectively.

4. The single-power, entire roof-lifting mechanism for recreational vehicles according to claim 1, wherein the lower ends of the first support members and the second support members are provided with rolling bearings respectively, and are in contact and cooperation with the guide members through the rolling bearings.

5. The single-power, entire roof-lifting mechanism for recreational vehicles according to claim 1, wherein the driving element comprises a bidirectional threaded screw rod, a first nut, a second nut, an electric motor, and a transmission member; a lower end of the first swing member is rotatably connected to the first nut, and the first nut is in threaded connection to a first helical section of the bidirectional threaded screw rod; the second nut is fixed to one end of the transmission member, and is in threaded connected to a second helical section of the bidirectional threaded screw rod, and the other end of the transmission member is rotatably connected to a lower end of the second swing member; and the electric motor is connected to one end, close to the first helical section, of the bidirectional threaded screw rod.

6. The single-power, entire roof-lifting mechanism for recreational vehicles according to claim 5, wherein the transmission member is a square tube, the second nut shaped in cuboid is positioned inside the transmission member, and the second nut has a greater axial length than the first nut.

7. The single-power, entire roof-lifting mechanism for recreational vehicles according to claim 2, wherein the electric motor comprises a built-in reducer, and is connected to slide up and down along one side wall in the compartment.

8. The single-power, entire roof-lifting mechanism for recreational vehicles according to claim 7, wherein the bidirectional threaded screw rod passes through the reducer to be provided with an overhanging portion, and the overhanging portion is detachably connected to a hand-operated mechanism.

9. The single-power, entire roof-lifting mechanism for recreational vehicles according to claim 1, wherein the driving element comprises an electric motor, transmission members, a gear, and a worm gear reducer; the transmission members comprises a first transmission member and a second transmission member, one ends of the first transmission member and the second transmission member are rotatably connected to lower ends of the first swing member and the second swing member respectively, and the other ends of the first transmission member and the second transmission member engage with an upper end and a lower end of the gear through a rack respectively; and the electric motor is connected to one end of a worm shaft of the worm gear reducer, so as to drive the gear to rotate.

10. The single-power, entire roof-lifting mechanism for recreational vehicles according to claim 9, wherein the other end of the worm shaft of the worm gear reducer extends outwards to be detachably connected to a hand-operated mechanism.

* * * * *